(12) United States Patent
Beigel

(10) Patent No.: US 6,924,691 B2
(45) Date of Patent: Aug. 2, 2005

(54) RECTIFYING CHARGE STORAGE DEVICE WITH SENSOR

(75) Inventor: Michael L. Beigel, Encinitas, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 0 days.

(21) Appl. No.: 10/713,913

(22) Filed: Jul. 1, 2003

(65) Prior Publication Data

US 2004/0212426 A1 Oct. 28, 2004

Related U.S. Application Data (63) Continuation-in-part of application No. 10/155,518, filed on May 24, 2002, now Pat. No. 6,642,782, which is a continuation of application No. 09/723,897, filed on Nov. 28, 2000, now Pat. No. 6,414,543.

(51) Int. Cl.[7] .............................................. H01L 35/00
(52) U.S. Cl. ........................................ 327/509; 327/586
(58) Field of Search ................................. 327/509, 512, 327/513, 514, 516, 564, 565, 566, 586

(56) References Cited

U.S. PATENT DOCUMENTS

| | | | |
|---|---|---|---|
| 3,813,927 A | | 6/1974 | Furgason |
| 3,840,800 A | | 10/1974 | Laupman |
| 4,333,072 A | | 6/1982 | Beigel |
| 4,876,211 A | * | 10/1989 | Kanber et al. ............... 438/379 |
| 5,557,140 A | * | 9/1996 | Nguyen et al. ............. 257/596 |
| 5,731,691 A | | 3/1998 | Noto |
| 5,854,117 A | | 12/1998 | Huisman et al. |
| 5,915,197 A | | 6/1999 | Yamanaka et al. |
| 5,973,598 A | | 10/1999 | Beigel |
| 6,037,718 A | | 3/2000 | Nagami |
| 6,087,196 A | | 7/2000 | Sturm et al. |
| 6,414,543 B1 | | 7/2002 | Beigel et al. |

* cited by examiner

Primary Examiner—Jeffrey Zweizig
(74) Attorney, Agent, or Firm—Kelly Lowry & Kelley LLP (57) ABSTRACT

A rectifying charge storage device, consisting of a rectifier and capacitor which share common elements, includes a sensor responsive to a monitored parameter such as pressure or the presence of a target chemical agent, to produce a variable and detectable electronic signal representative of the monitored parameter.

45 Claims, 5 Drawing Sheets

RECTIFYING CHARGE STORAGE DEVICE WITH SENSOR

This is a continuation-in-part of copending U.S. Ser. No. 10/155,518, filed May 24, 2002, and published as Publication No. US 2002/0140500 A1 on Oct. 3, 2002 now issued as U.S. Pat. No. 6,642,782, which in turn is a continuation of U.S. Ser. No. 09/723,897, filed Nov. 28, 2000, and now issued as U.S. Pat. No. 6,414,543 on Jul. 2, 2002.

BACKGROUND OF THE INVENTION

This invention relates generally to improvements in and to a rectifying charge storage device of the type having a rectifier and capacitor which share common elements, as described in U.S. Pat. No. 6,414,543 and U.S. Publication U.S. 2002/0140500 A1. More particularly, this invention relates to an improved rectifying charge storage device having an integrated sensor responsive to a monitored parameter such as pressure, light, temperature, humidity, vibration, sound, magnetic field or the presence of a target chemical agent, to produce an electronic signal representative of the monitored parameter.

U.S. Pat. No. 6,414,543 and U.S. Publication US 2002/0140500 A1, which are incorporated by reference herein, disclose embodiments for a rectifying charge storage element and related electronic circuits suitable for fabrication on various substrates, including flexible substrates, by various means including printing or other deposition techniques using organic conductors, semiconductors and insulators and other electronic materials suitable for deposition and use in electronic circuits. This rectifying charge storage element is disclosed for use as a power supply that extracts DC power (voltage and current) sufficient to power an electronic device from an AC input signal. The AC input signal may be derived from an inductive, capacitive, or L-C resonant circuit coupled to external AC electromagnetic field or electrostatic AC field. The electronic circuit thus powered may comprise a radio frequency identification (RFID) circuit.

In this regard, most electronic circuits require a source of DC voltage with sufficient current output to power the circuit elements. Many of these circuits derive DC power by rectifying and filtering an AC power signal Often, the AC signal is provided to the circuitry by electromagnetic coupling. For example, a passive RFID tag system must be capable of receiving power from an RFID reader to the RFID tag via an inductive (H-field) or electric field (E-field) coupling, and transmitting data from the tag to the reader also via inductive or electric field coupling. The activation field frequency for typical RFID devices may range from less than about 100 kHz up to more than about 30 MHz if inductive or capacitive coupling is utilized, and up to the UHF and microwave region if electric field RF antenna coupling is used. In current industry practice, operating power to a passive RFID tag or other electronic circuit is derived by utilizing a rectifier device and a charge-storage device, typically a rectifier diode or combination of diodes connected to a charge storage capacitor or combination of capacitors. In the past, these elements have been implemented as separate components within a discrete circuit or silicon integrated circuit. See, for example, U.S. Pat. No. 4,333,072.

Recent advancements in circuitry manufacturing processes, applicable to RFID tag and similar electronic circuit systems, have enabled the production of electronic circuits on flexible substrates using thin film materials such as organic and polymer semiconductors and other substances that can be applied by techniques such as ink jet printing. A primary objective is to produce electronic devices that have operating characteristics similar to discrete or integrated silicon circuit technology sufficient to operate certain types of circuits while approaching the economy of printing processes. See, for example, U.S. Pat. Nos. 5,973,598 and 6,087,196.

The rectifying charge storage device disclosed in the above-referenced U.S. Pat. No. 6,414,543 and U.S. Publication US 2002/0140500A1 incorporates a rectifier component such as a rectifying diode in combination with a charge storage component such as a capacitor, wherein these components share one or more common elements resulting in a composite device that is particularly suited for economical manufacture as by printing processes or the like. In addition, the composite device is especially suited for support on a flexible substrate which may comprise an integral portion of the device. Moreover, the supporting substrate may also comprise an electrically operative portion of the device. However, this rectifying charge storage device has many uses in electronic circuitry other than as a power supply device.

SUMMARY OF THE INVENTION

In accordance with the invention, an improved composite rectifying charge storage device is provided of the type shown and described in U.S. Pat. No. 6,414,543 and U.S. Publication US 2002/0140500 A1, wherein a portion of the composite device comprises a selected material comprising a sensor responsive to a desired environmental parameter including but not limited to pressure, light, temperature, humidity, vibration, sound, magnetic field or the presence of a target chemical agent. The sensor is incorporated into the composite device for altering the electrical characteristics thereof as a variable function of the monitored parameter, wherein such electrical characteristics can be monitored to provide a detectable representation of the monitored parameter.

In one preferred form of the invention, the composite rectifying charge storage device includes a rectifier such as a diode and a capacitor having a common conductor. The capacitor comprises spaced-apart conductive surfaces or areas defined by this common conductor and a second conductor with a dielectric material therebetween. In one form, the common conductor may comprise either the cathode or anode connection to the rectifying diode. In another form, the rectifier comprises a semiconductor material providing the dual functions of rectification and forming the dielectric material between the conductive plates of the capacitor. In either configuration, the device may be formed as by ink jet printing or the like onto a substrate which may comprise a flexible substrate. The substrate may be provided as a separate component having the rectifying charge storage device formed or mounted thereon. Alternately, the substrate can be formed integrally with the rectifying and charge storage device, for example, by integrating the substrate with the dielectric material.

In one preferred form, the dielectric material incorporates the selected sensor responsive to a desired environmental parameter to be monitored. This sensor may comprise an elastomer that exhibits a variable resistance in response to applied pressure, such as a pressure sensitive conductive elastomer of the type described in U.S. Pat. No. 5,175,214, which is incorporated by reference herein. Under minimal applied pressure, this variable resistance sensor component provides a higher resistance in comparison with an elevated applied pressure condition, whereby the capacitor of the composite device is capable of storing a charge generally in inverse proportion to the applied pressure. As the applied pressure increases, the sensor component reacts by decreasing the resistance between the capacitor conductors, causing a change in capacitor leakage current that can be monitored as a representation of pressure.

In one alternative preferred form, the dielectric material incorporates an alternative sensor such as an elastomer which mechanically increases or decreases dimension, or otherwise undergoes change in terms of physical or electrical characteristics in response to the presence of a target chemical agent. In one such form, the sensor comprises a hydrocarbon swellable elastomer of the type described in U.S. Pat. No. 5,341,128, which is incorporated by reference herein. In the presence of hydrocarbons which may be in gas or vapor form, the dimensional spacing between the capacitor plates changes to result in a detectable change in capacitance. In another form, the sensor comprises a polymer capable of undergoing physical dimensional changes and/or electrical changes such as variations in electrical resistance or dielectric constant in response to the presence of a target chemical agent, as described in U.S. Pat. No. 5,512,882, which is also incorporated by reference herein.

In a further alternative preferred form of the invention, the sensor may comprise a light responsive device such as a photosensitive or opto-electronic diode or the like responsive to incident light, for varying the electrical characteristics of the composite rectifying charge storage device as a variable function of the presence or intensity of incident light.

In some configurations of the invention, the sensor can be designed for permanently altering the electrical characteristics of the composite device in response to detection of the monitored parameter. Such alteration may occur either as a continuous change or as a discrete change occurring at a predetermined threshold level. In one such example, the sensor may comprise a diode or capacitor element designed to change state upon in response to a selected electrical parameter of an input signal, such as voltage, current, frequency, or rate of change thereof. The sensor state change may be irreversible (i.e., permanent), or reversible.

In each configuration, upon appropriate driving of the composite rectifying and charge storage device as by coupling a suitable input signal thereto, the sensor responds to the monitored parameter to vary the electrical characteristics of the composite device. As a result, the composite produces a variable output signal which can be monitored as a representation of the monitored parameter.

Other features and advantage of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
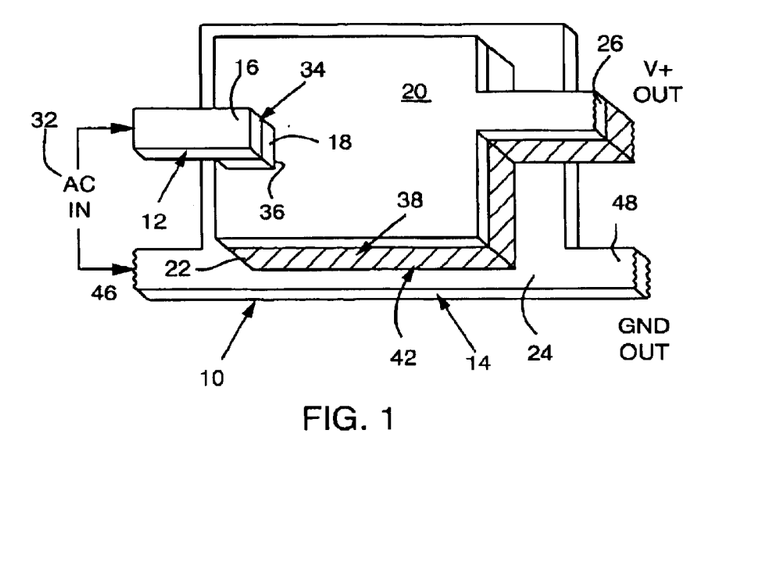
FIG. 1 is a somewhat schematic perspective view illustrating a composite rectifying charge storage device constructed in accordance with the teachings of the invention, and incorporating a sensor for monitoring a selected parameter.

As shown in the exemplary drawings, an improved composite rectifying charge storage device referred to generally in FIG. 1 by the reference numeral 10 incorporates a sensor responsive to changes in an environmental parameter, such as pressure, light, temperature, humidity, vibration, sound, magnetic field or the presence of a target chemical agent. The sensor is integrated into the device 10 for altering physical and/or electrical characteristics of the device in response to changes in the monitored parameter, to provide a variable electrical characteristic or signal which can be monitored as a representation or indication of the monitored parameter.

The improved rectifying charge storage device of the present invention corresponds generally with and represents an improvement upon the device shown and described in parent U.S. Pat. No. 6,414,543 and in copending U.S. Publication US 2002/0140500 A1, both of which are incorporated by reference herein. In this regard, as viewed in FIG. 1 with respect to one preferred form of the invention, the illustrative rectifying charge storage device 10 generally includes a diode rectifier 12 and a capacitor 14. The diode 12 includes a conductor 16 and a semiconductor 18. A common conductor 20 between the diode 12 and capacitor 14 is superimposed on a dielectric component 22 of the capacitor 14 which, in turn, is mounted on a conductor 24.

The conductor 16 is electrically connected to one terminal 30 of a suitable AC source 32, and is electrically connected to one surface of the semiconductor 18 at a surface interface 34. The opposite surface of the semiconductor 18 is electrically connected to the common conductor 20 at a surface interface 36. The common conductor 20 is connected to the dielectric component 22 at a surface interface 38, and the conductor 24 is connected to the dielectric component 22 at a surface interface 42. The conductor 24 is connected to a second terminal 46 of the AC source 32 and also serves as the ground output terminal 48.

Rectification takes place between the conductor 16, the semiconductor 18, and the common conductor 20 through the interfaces 34 and 36. Charge storage takes place between the common conductor 20, the dielectric component 22, and the conductor 24. The surface area of the rectifying component and 16, 34, 18, 36, and 20 interfaces may if desired be minimized to reduce internal parasitic capacitor characteristics inherent in rectification. The surface area of the capacitive component interface provided by the common conductor 20 may if desired be maximized to increase DC charge storage capacity. In power supply application, the common conductor 20 provides the DC power at a junction 26 and the circuit connected to the device 10 may be energized thereby inductively, electrostatically, magnetically, or directly.

The diode components may be fabricated from various materials, including inorganic semiconductor nanocrystals such as CdSe, InP, and others. Furthermore, conjugated polymers may be used, such as poly(phenylene-vinylene) (PPV), its derivatives and co-polymers (such as MEH-PPV (poly(2-methoxy, 5-(2'-ethyl-hexoxy)-p-phenylene vinylene))); polyfluorene (PF), its derivatives and co-polymers; polyparaphenylene (PPP), its derivatives and co-polymers; polythiophene (PT), its derivatives and co-polymers; and others.

The rectifying function of the diode 12 is implemented through the conductor 16 which serves as the anode and the common conductor 20 which serves as the cathode. The rectifying character of an organic or a polymeric diode usually requires different conductors with different work functions for the anode and for the cathode. Organic and polymeric semiconductors are usually regarded as semiconductors with low doping concentration (usually in the range of ~$10^{13}$ cm$^{-3}$), hence the theory of p-n junction commonly used inorganic semiconductor diodes is not applicable here.

For inorganic diodes, metal electrodes for the anode and cathode can be the same material with ohmic contacts to the p-type and n-type semiconductor, respectively. The rectifying behavior is from the p-n junction.

For organic semiconductors, the relative position of the work functions (or the energy level) of the metal electrodes to the energy levels of the conduction band and valence band of the organic semiconductor determines the rectifying behavior. The choice of anode hence is preferentially to be high work function metals such as gold, nickel, and their alloys. Alternatively, some metal oxides, including but not limited to indium tin-oxide, indium oxide, are also candidates for the anode material. For the cathode, the choice is preferentially low work function metals, including but not limited to calcium, lithium, magnesium, and others. Recently, the metal alloys consisting of a small amount of low work function metals, such as aluminum:lithium 3% alloy and 97% Al:LiF bilayer electrode, have become alternatives for the choice of cathode material.

The materials for the capacitor dielectric 22 should be insulating materials, preferentially with a high dielectric constant to enhance its capacity. The structure of the capacitor 14 should provide a larger area compared to the diode. The dielectric 22 may be an organic or polymeric or inorganic insulator with reasonable dielectric constant. Currently, polymer materials such as polystyrene, polyethylene, and polycarbonate are ideal candidates. The dielectric 22 should be flexible where the other components of the device 10 are flexible. An organic semiconductor can also be used as the dielectric material provided that the conductors defining the capacitor 14 have the same work function.

Alternative organic semiconductors, referred to a high performance organic semiconductor devices, are shown and described in copending U.S. Ser. No. 10/218,141, filed Aug. 12, 2002, and incorporated by reference herein.

In accordance with the present invention, the sensor is incorporated directly into the device 10. In one preferred form, the sensor comprises or is otherwise integrated into the dielectric 22, wherein the sensor material or component provides the capability to respond to changes in the monitored parameter in a manner altering the electrical characteristics of the composite device 10, as by altering the dielectric constant or resistance or physical thickness presented by the dielectric 22.

In this regard, in one preferred form for monitoring and providing an output signal representative of pressure within the environment in which the device 10 is placed, the dielectric 22 comprises a suitable insulative material comprising or otherwise loaded with or containing a pressure sensitive conductive elastomer or compound thereof exhibiting variable electrical conductivity or resistance as a function of applied environmental pressure. One such material is described in U.S. Pat. No. 5,175,214, which is incorporated by reference herein, and comprises an insulated polymer with a matrix of carbonized conductive particles dispersed therein. This pressure sensitive conductive elastomer compound provides a relatively high resistance under little or no applied force or pressure, whereby the capacitor 14 is capable of storing a relatively high charge. As the applied pressure increases, the resistance of the sensor compound progressively decreases to cause a detectable change in leakage current through the capacitor, and a correspondingly reduced charge storage capacity. Accordingly, upon coupling of the composite device 10 to a suitable input drive signal, the electrical characteristics of the device 10 vary in response to changes in the applied pressure, wherein the device output comprises an electrical signal representative of such changes and thus can be monitored continuously or periodically as an indicative of actual applied pressure.

In alternative forms, the sensor compound comprising or integrated into the dielectric 22 may be designed for increased or decreased dimension, or other change in terms of physical or electrical characteristics in response to the monitored parameter. In one such form, the sensor component comprises a hydrocarbon swellable elastomer of the type described in U.S. Pat. No. 5,341,128, which is incorporated by reference herein, wherein this swellable elastomer is adapted for physical dimensional change in response to a target chemical agent such as a hydrocarbons which may be present in gas or vapor form. Either of both of the conductors 20, 24 may have gaps or porous surfaces to allow target chemicals to contact the dielectric material. In the presence of such hydrocarbons, when the swellable elastomer is used in or comprises the dielectric 22, the dimensional spacing between the capacitor conductors 20 and 22 changes to result in a detectable change in capacitance which can be monitored at the device output. In another form, the sensor may comprise a polymer loaded with conductive elements in spatial array and capable of undergoing physical and/or electrical characteristic changes such as dimensional changes or electrical resistance changes in response to the presence of a target chemical agent in vapor form, as described in U.S. Pat. No. 5,512,882, which is also incorporated by reference herein.

In a further alternative preferred form of the invention, the sensor may comprise a light responsive device such as a photoconductive diode, photovoltaic diode, or the like responsive to incident light, for varying the electrical characteristics of the composite device 10 as a variable function of the intensity or presence of incident light. In such embodiment, the sensor may comprise a photoconductive diode 12 wherein, for example, the anode conductor 16 comprises a thin optically transmissive material such as indium tin oxide or other selected thin layer metallic conductor, and the diode 12 comprises a polymer semiconductor formed from a material such as MEH-PPV. Persons skilled in the art will recognize, however, that a variety of other light sensitive sensor constructions and configurations may be employed, with the result that the output of the composite device 10 can be monitored to provide an indication of the presence of incident light, or an incident light signal. Alternately, such optically transmissive material may be used for the common conductor 20 at the cathode side of the diode 12.

Moreover, it will be appreciated that a light emitting diode 12 may be utilized for providing a light output signal from the composite device, wherein such light output may be monitored to provide an indication of variations in a monitored parameter, such as pressure or other parameter variations as previously described herein.

In another alternative form, the sensor can be designed for functioning as a switch to alter the electrical characteristics of the composite device 10 in response to detection of the monitored parameter at a predetermined threshold level. In one such example, the sensor may be provided in the form of the diode 12 or the capacitor 14, or both, adapted to act as a fuse by changing permanently from a conductive to a non-conductive state, or vise versa, upon the application of an electrical signal at or exceeding a predetermined limit, which such signal is representative of a selected monitored parameter. The sensor component or components may be designed for response to voltage, and/or current, and/or frequency, and/or rate of change thereof. A break diode or a break capacitor of a type known in the art may be used. Alternately, a reversible diode or capacitor may be used, such as an organic bistable device of the type shown and described in *Organic Bistable Light Emitting Devices*, Ma et al, Applied Physics Letters, Vol. 80, No. 5, pp. 362–364, 2002, and *Organic Electrical Bistable Devices and Rewritable Memory Cells*, L. Ma et al, Applied Physics Letters, Vol. 80, No. 6, pp. 2997–2999, 2002, both of which are incorporated by reference herein. See also PCT Publication WO 02/37500 A1, which is also incorporated by reference herein.

In the fabrication of the device 10, traditional polymer and organic device fabrication processes may be utilized. Polymer and organic thin films can be processed by spin-coating, ink-jet printing, roll-to-roll coating, and other coating methods. Organic thin films can also be deposited by thermal sublimation, chemical vapor deposition, and analogous methods. Metal electrodes can be deposited on a substrate by thermal deposition under high vacuum or by the ink-jet printing process. Where conventional materials are utilized, the components of the device 10 can be assembled by the use of materials and processes well known to those skilled in the art.

FIGS. 2–8 show illustrative alternative embodiments of the invention conforming to the embodiments shown and described in parent U.S. Pat. No. 6,414,543 and in copending U.S. Publication US 2002/0140500 A1. It will be recognized and understood that the sensor component as described above with respect to the embodiment of FIG. 1 may be employed in each of the embodiments depicted in FIGS. 2–8, for use in monitoring a selected environmental parameter such as pressure, light, temperature, humidity, vibration, sound, magnetic field, or the presence of a target chemical agent in liquid or vapor form, or others.

Figure 2:
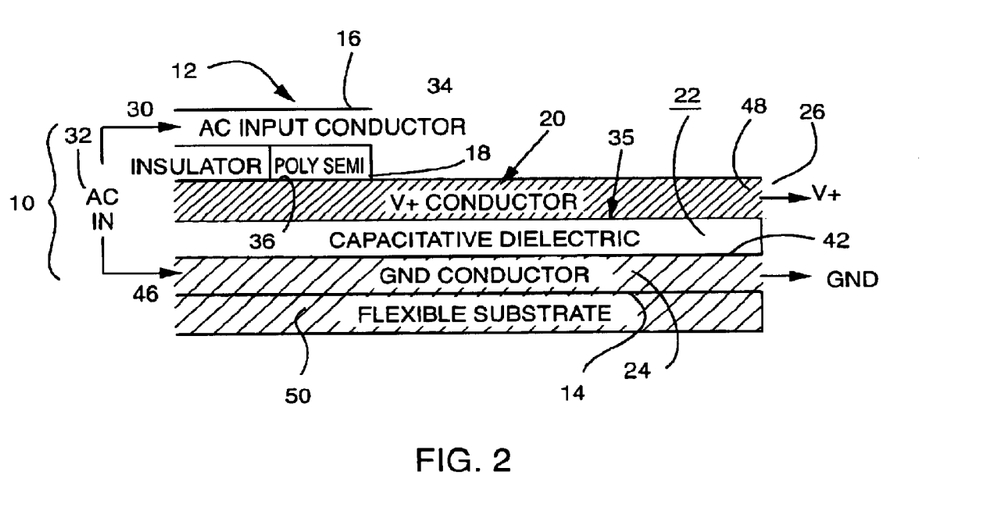
FIG. 2 is a schematic sectional view showing the device of FIG. 1 mounted on a flexible substrate.

More particularly, the device 10 of FIG. 1 is shown in FIG. 2 as mounted on a flexible substrate 50 with all of the other components of the device 10 being the same reference numerals as the device 10 of FIG. 1.

Figure 3:
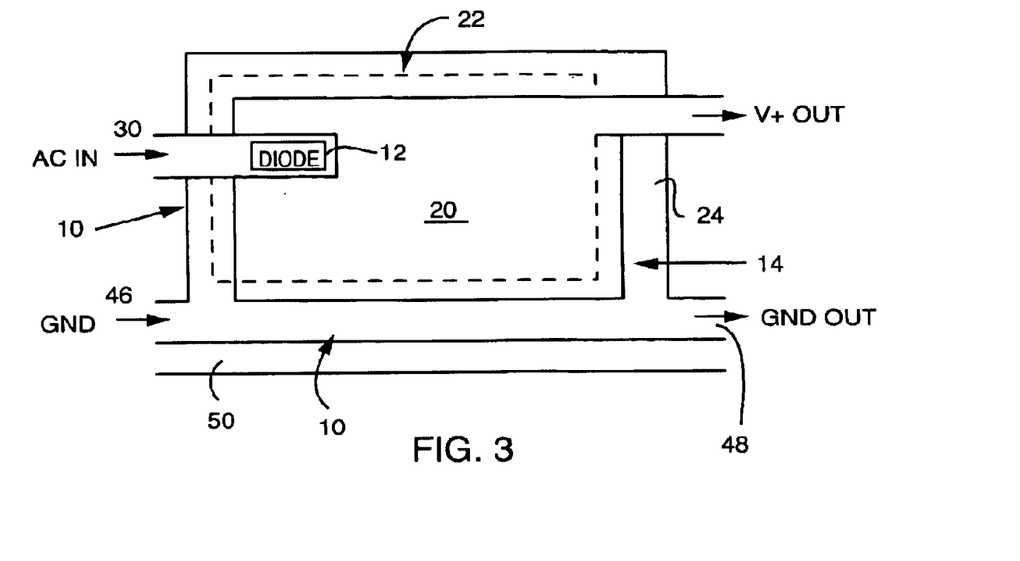
FIG. 3 is a somewhat schematic plan view of the device of FIG. 2.

FIG. 3 is a top plan view of the device 10 of FIG. 2 and shows the device 10 superimposed on the top surface of a flexible substrate 50. The flexible substrate 50 may be manufactured from any type of material. Where a flexible substrate, such as the substrate 50, is provided, it is desirable that all of the components of the device 10 be correspondingly flexible so that the device 10 may be mounted, through the flexible substrate 50, in environments where such flexibility is indicated. Typical substrates are sheets or strips of polyethylene, polyvinylchloride, or the like.

Figure 4:
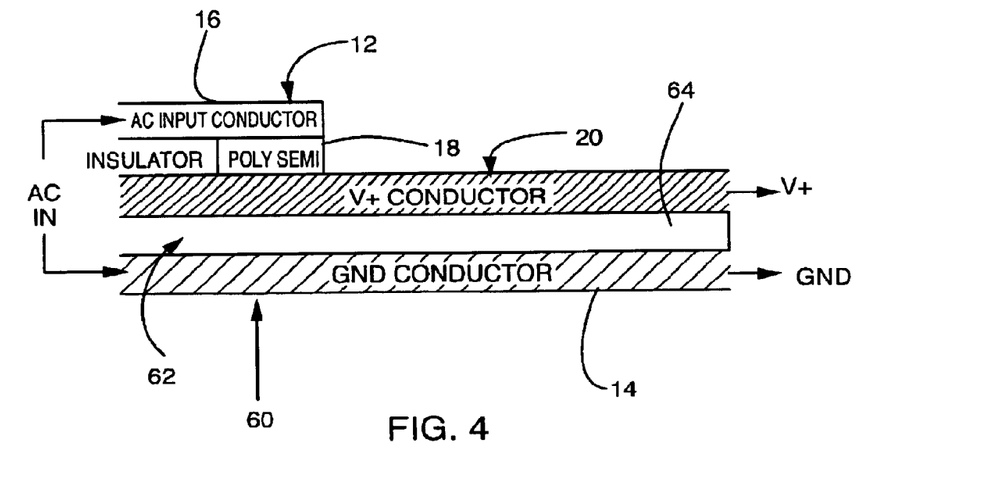
FIG. 4 is a schematic sectional view similar to FIG. 2, and depicting one alternative preferred form of the invention incorporating a flexible substrate.
Figure 5:
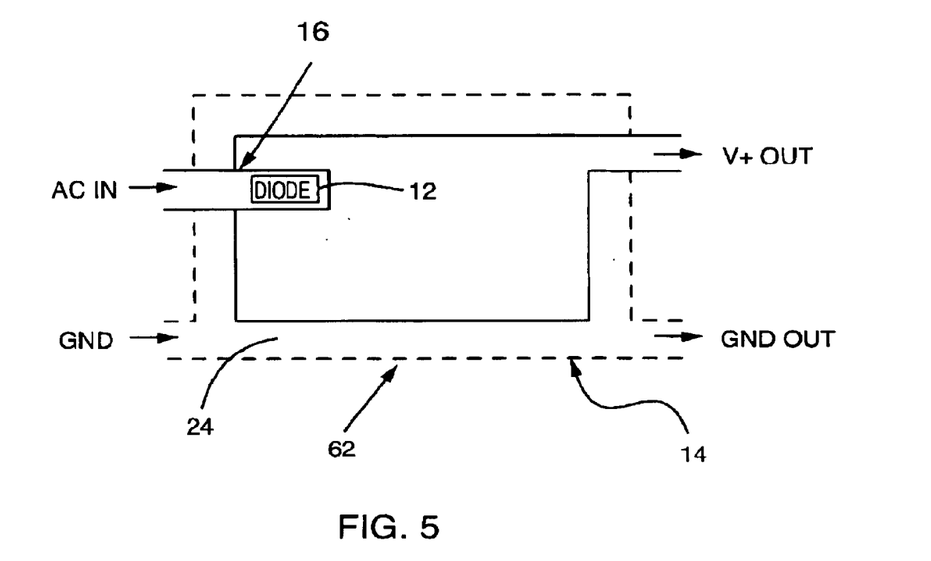
FIG. 5 is a somewhat schematic plan view of the device of FIG. 4.

An alternative embodiment 60 of the device 10 is shown in FIG. 4 in cross section and includes elements identical with or similar to the corresponding elements of FIGS. 1–3, said elements being provided with the same reference numerals as those of FIGS. 1–3. The major difference between the device 60 of FIG. 4 and the device 10 lies in the provision of a dielectric 62 which is incorporated in a flexible substrate 64. Once again, the flexible substrate can be manufactured from strip or sheet plastic material such as polyvinylchloride, polystyrene, polyethylene, and the like. The device of FIG. 4 is shown in plan in FIG. 5. Although the flexible substrate 62 is shown as protruding beyond the limits of the remaining elements of the device 60, it is not intended that the actual commercial device be limited to that particular configuration since it is contemplated that the devices be extremely miniaturized.

Figure 6:
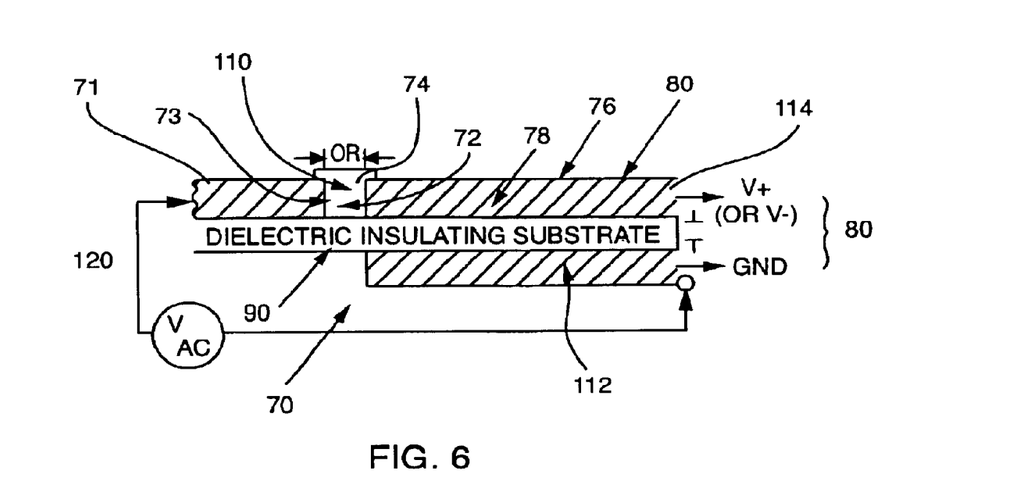
FIG. 6 is a schematic sectional view similar to FIG. 2, and illustrating a further alternative preferred form of the invention.

An alternative embodiment 70 of the composite device 10 is shown in FIG. 6 and functions in the same manner as the devices of FIGS. 1–5. However, the various elements of the embodiment 70 are disposed in planar rather than a superimposed relationship which is characteristic of the previously discussed embodiments of FIGS. 1–5. The planar relationship of the various components minimizes the parasitic capacitance of the diode and also provides for various advantages in device fabrication. The device 70 incorporates a conductive layer 71 having a low work function and terminating to create a gap 72. The conductive layer 71 forms the anode terminal 73 of the rectifying diode 74. A common conductive layer 76 having a high work function and larger surface area than the first conductive layer 71 is provided at the gap 72 and constitutes the cathode of the diode 74 as well as the top layer 78 of the capacitor 80. A dielectric substrate 90 is provided below the conductors 71 and 76 and an organic molecular semiconductor 110 is provided across the gap and permits the performance of the rectifier function of the device 70. A conductive layer 112 underlies the dielectric substrate 90 and the completion of the capacitor 70 is accomplished. An AC circuit 120 is connected at one side to the conductive layer 71 and at the opposite side to the layer 112 which acts as the ground of the circuit. The DC output is located at 114 on the layer 76.

The planar structure of the device 70 (FIG. 6) permits the formation of a composite device of opposite polarity by using opposite combinations of high and low work function conductors such as the layers 71 and 76. In particular, by reversing the work functions of the conductive layers 71 and 76, so that the conductive layer 71 has a high work function and the conductive layer 76 has a low work function, the DC output at terminal 114 will be reversed in polarity, namely, V– instead of V+.

Figure 7:
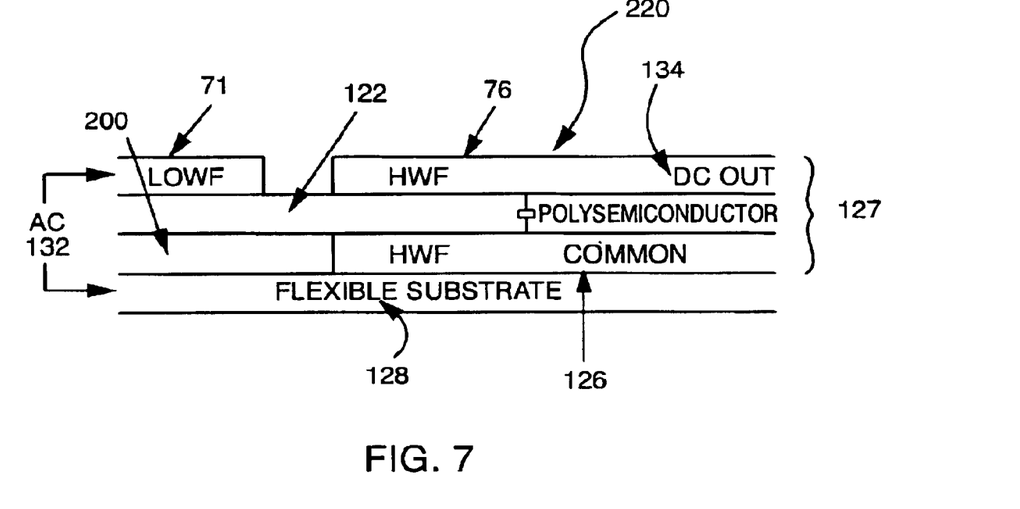
FIG. 7 is another schematic sectional view similar to FIG. 2, and showing still another alternative preferred form of the invention.

An alternative planar device 220 is shown in FIG. 7 as including the layers 71 and 76 of the device 70 of FIG. 6.

However, instead of incorporating the flexible dielectric 110 of the device 70, a common layer 122 is provided which serves as a semiconductor connection to the common layer 76 and as a dielectric between the common layer 76 and the layer 126 of a capacitor 127. Therefore, in this embodiment, there are two elements of the device 220 serving a common function, namely, the semiconductor/dielectric layer 122 and the common conductive layer 76. The layer 126 is a high work function layer and serves as the ground for the circuit of the device 120. The provision of the coplanar layers 71 and 76 and the common performance of the layer 76 and the layer 122 greatly simplify the fabrication of the device 120 on the flexible substrate. There is an air gap 200 or other insulating layer between the poly-semiconductor 122 and the flexible substrate 128. This air gap 200 is adjacent to the layer 126. The AC input 132 is connected on one side to the anode layer 71 and on the other side to the common conductor layer 76 with the DC output being connected to the layer 76 at 134.

Figure 8:
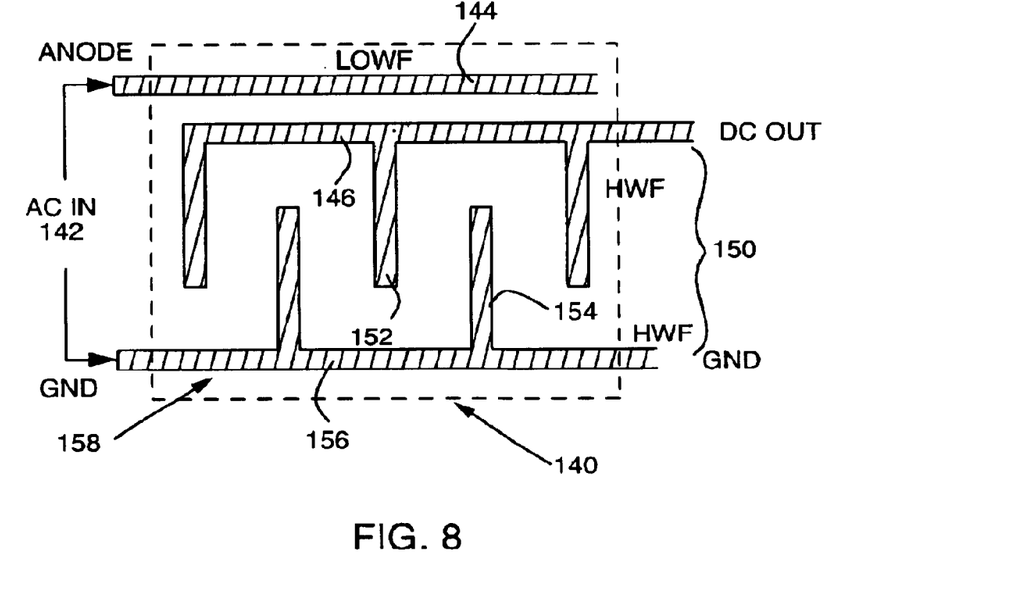
FIG. 8 is a schematic plan view depicting yet another alternative preferred form of the invention.

An alternative embodiment 140 of the device is shown in FIG. 8 of the drawings as including an AC input at 142 which is connected to an anode 144. The anode 144 communicates with one side 146 of an interdigitate capacitor unit 150. The interdigitate capacitor layers or fingers 152 of said one side fit between corresponding layers or fingers 154 of the other side 156. The entire assemblage is encapsulated or overlaid by semiconductor/dielectric material 158 to create the rectification and capacitance effects. The device 150 is particularly suited to deposition on a flexible substrate and is susceptible to various well-established methods of deposition conductors such as conductive inks, organic polymers, or the like.

In each of these alternative configurations for the composite rectifying charge storage device, sensor operation is obtained by providing one or more of the components of the composite device in the form of a sensor for providing the desired variation of the electrical characteristics of the composite device in response to the chemical or electrical parameter to be monitored. Such parameter variations can be monitored as by monitoring of an output signal of the composite device.

Figures 9, 10:
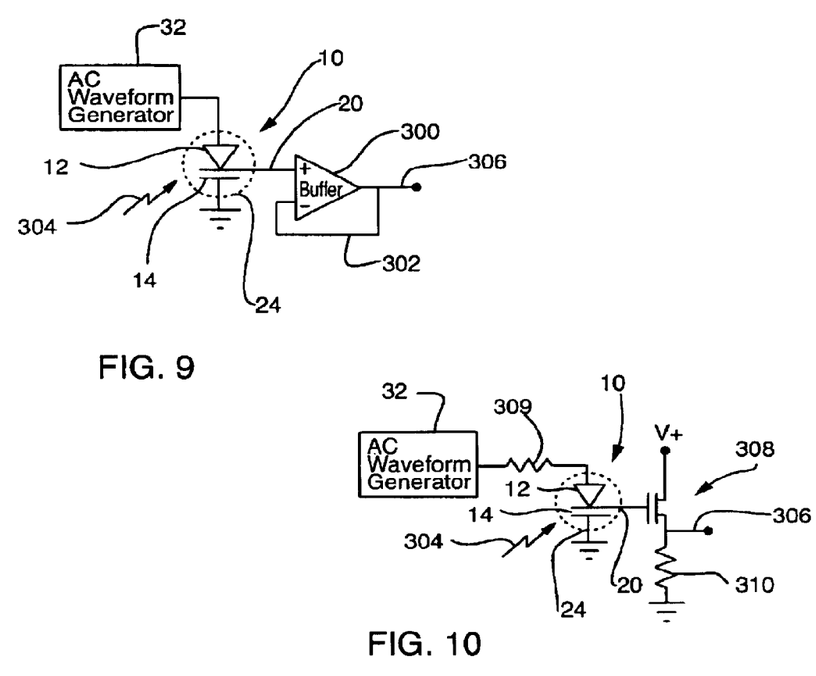
FIG. 9 is a circuit diagram illustrating the composite device incorporating a sensor for producing an amplified output signal representative of a monitored parameter.
FIG. 10 is a circuit diagram depicting the composite device in an alternative circuit arrangement for producing an output signal representative of a monitored parameter.
Figure 11:
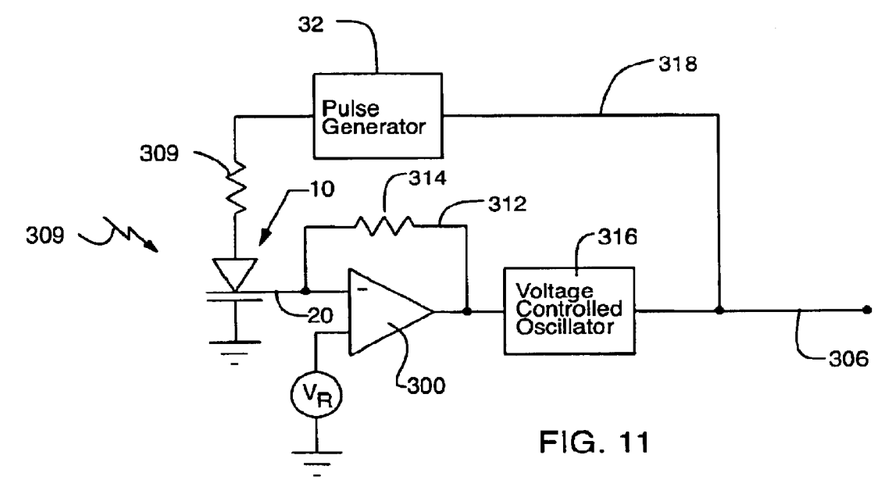
FIG. 11 is another circuit diagram showing the composite device in a circuit arrangement for producing a variable frequency output signal representative of a monitored parameter.

FIGS. 9–11 illustrate exemplary circuit arrangements incorporating the composite device 10 with sensor component, wherein the composite device 10 may be constructed in accordance with any one of the embodiments previously described and shown herein to produce an output signal representative of the monitored parameter.

More particularly, FIG. 9 shows the composite device 10 with the diode component 12 thereof connected to an input signal such as a pulse generator shown in the form of an AC input waveform 32. The common conductor 20 shared by the diode and capacitor components 12, 14 of the composite device 10 is connected to the (+) terminal of an operational amplifier 300, which in turn has its (−) terminal connected to a negative feedback line 302. The second conductor 24 of the capacitor component 14 is coupled to ground. In this circuit configuration, a variable voltage signal is provided on the common conductor 20, in response to changes in a monitored parameter such as pressure or the like as previously described herein, and as illustrated in FIG. 9 by arrow 304. This variable voltage signal is coupled to the amplifier 300 which provides a high-impedance buffer for the sensor and is coupled to an output line 306.

FIG. 10 depicts a variation of the circuit arrangement shown in FIG. 9, wherein an FET transistor 308 is used in lieu of the operational buffer amplifier 300. In this circuit configuration, the composite device 10 including the diode and capacitor components 12, 14 sharing the common conductor 20 again incorporates a sensor component responsive to changes in a monitored parameter. The diode component 12 is coupled to an input signal such as the illustrative AC waveform 32 connected through an input resistor 309, and the second conductor 24 of the capacitor component 14 is coupled to ground. The composite device, including the sensor component, produces a variable voltage signal on the common conductor 20, in response to changes in the monitored parameter as illustrated by arrow 304. This variable voltage signal is coupled to the gate of the FET transistor 308, which has its source coupled to a reference voltage (V+) and its drain connected through a resistor 310 to ground. An output line 306 connected to the transistor drain junction carries an output voltage that is proportional to and thereby representative of the monitored parameter.

FIG. 11 shows a servo circuit configuration for producing an output signal having a variable frequency proportional to the monitored parameter. In this arrangement, the composite device 10 again comprises the diode and capacitor components 12, 14 sharing the common conductor 20, with the second conductor 24 of the capacitor component 24 again coupled to ground. A pulse generator 32 provides an input signal through an input resistor 309 to the diode component 12. The composite device 10 includes the appropriate sensor component responsive to changes in the monitored parameter, as illustrated by arrow 304, to produce a variable voltage signal on the common conductor 20. As shown in this circuit arrangement, the common conductor 20 is coupled to the (−) terminal of an operational amplifier 300, the (+) terminal of which is coupled to a reference voltage ($V_R$). The amplifier 300 also includes a negative feedback loop 312 with a feedback resistor 314. The amplifier compares the variable voltage signal on the common conductor 20 with the reference voltage ($V_R$) to produce a parameter-response variable output signal connected to a voltage controlled oscillator 316, which in turn produces a parameter-responsive variable frequency output signal connected to the output line 306. A feedback loop 318 is also shown for connecting this variable frequency output signal to the pulse generator 32.

A variety of further modifications and improvements in and to the rectifying charge storage device of the present invention will be apparent to persons skilled in the art.

What is claimed is:

1. A rectifying charge storage device, comprising:
   a rectifier structure fabricated with a common conductor forming a side of the rectifier structure;
   a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor; and
   one of said rectifier structure and said capacitor structure additionally including a sensor responsive to an environmental parameter for altering the electrical characteristics of the device as a variable function of the environmental parameter whereby changes in said electrical characteistics provide a detectable representation of the environmental parameter.

2. The rectifying charge storage device of claim 1 wherein said sensor is incorporated into said rectifier structure.

3. The rectifying charge storage device of claim 1 wherein said sensor is incorporated into said capacitor structure.

4. The rectifying charge storage device of claim 1 wherein said sensor comprises a pressure sensor.

5. The rectifying charge storage device of claim 1 wherein said sensor comprises a light sensor.

6. The rectifying charge storage device of claim 1 wherein said sensor is responsive to a target chemical agent.

7. The rectifying charge storage device of claim 1 wherein said capacitor structure comprises said common conductor, a second conductor, and a dielectric material therebetween, said sensor being incorporated into said dielectric material.

8. The rectifying charge storage device of claim 7 wherein said sensor is responsive to the environmental parameter for altering the electrical resistance between said common and second conductors.

9. The rectifying charge storage device of claim 8 wherein said sensor comprises an insulated polymer incorporating a matrix of conductive particles therein.

10. The rectifying charge storage device of claim 7 wherein said sensor is responsive to the environmental parameter for altering the dielectric constant of said capacitor structure.

11. The rectifying charge storage device of claim 7 wherein said sensor is responsive to the environmental parameter for altering the dimensional spacing between said common and second conductors.

12. The rectifying charge storage device of claim 11 wherein said sensor comprises a swellable elastomer.

13. The rectifying charge storage device of claim 1 wherein said sensor comprises a photosensitive diode.

14. The rectifying charge storage device of claim 1 wherein said sensor comprises a light emitting diode.

15. The rectifying charge storage device of claim 1 wherein said sensor comprises a break diode.

16. The rectifying charge storage device of claim 1 wherein said sensor comprises a break capacitor.

17. The rectifying charge storage device of claim 1 wherein said sensor is adapted for irreversible state change in response to detection of the environmental parameter.

18. The rectifying charge storage device of claim 1 further including an amplifier circuit coupled to said common conductor for providing an output signal representative of the environmental parameter.

19. The rectifying charge storage device of claim 18 wherein said amplifier circuit includes an FET transistor.

20. The rectifying charge storage device of claim 18 wherein said output signal is a parameter-responsive variable voltage output signal.

21. The rectifying charge storage device of claim 18 wherein said output signal is a parameter-responsive variable frequency output signal.

22. The rectifying charge storage device of claim 1 further including a substrate supporting the rectifier and capacitor structures.

23. The rectifying charge storage device of claim 22 wherein said capacitor structure comprises said common conductor, a second conductor, and a dielectric material therebetween, said substrate being incorporated into said dielectric material.

24. A rectifying charge storage device, comprising:
a rectifier;
a common conductor connected to one side of said rectifier;
a capacitor incorporating said common conductor;
said rectifier, common conductor and capacitor comprising a unitary element; and
a sensor responsive to an environmental parameter for altering the electrical characteristics of the unitary element as a variable function of the environmental parameter whereby changes in said electrical characteistics provide a detectable representation of the environmental parameter.

25. The rectifying charge storage device of claim 24 wherein said sensor in incorporated into one of said rectifier said capacitor.

26. The rectifying charge storage device of claim 24 wherein said sensor comprises a pressure sensor.

27. The rectifying charge storage device of claim 24 wherein said sensor comprises a light sensor.

28. The rectifying charge storage device of claim 24 wherein said sensor is responsive to a target chemical agent.

29. The rectifying charge storage device of claim 24 wherein said capacitor comprises said common conductor, a second conductor, and a dielectric material therebetween, said sensor being incorporated into said dielectric material.

30. The rectifying charge storage device of claim 29 wherein said sensor is responsive to the environmental parameter for altering the electrical resistance between said common and second conductors.

31. The rectifying charge storage device of claim 30 wherein said sensor comprises an insulated polymer incorporating a matrix of conductive particles therein.

32. The rectifying charge storage device of claim 29 wherein said sensor is responsive to the environmental parameter for altering the dielectric constant of said capacitor.

33. The rectifying charge storage device of claim 29 wherein said sensor is responsive to the environmental parameter for altering the dimensional spacing between said common and second conductors.

34. The rectifying charge storage device of claim 33 wherein said sensor comprises a swellable elastomer.

35. The rectifying charge storage device of claim 24 wherein said sensor comprises a photosensitive diode.

36. The rectifying charge storage device of claim 24 wherein said sensor comprises a light emitting diode.

37. The rectifying charge storage device of claim 24 wherein said sensor comprises a break diode.

38. The rectifying charge storage device of claim 24 wherein said sensor comprises a break capacitor.

39. The rectifying charge storage device of claim 24 wherein said sensor is adapted for irreversible state change in response to detection of the environmental parameter.

40. The rectifying charge storage device of claim 24 further including an amplifier circuit coupled to said common conductor for providing an output signal representative of the environmental parameter.

41. The rectifying charge storage device of claim 40 wherein said amplifier circuit includes an FET transistor.

42. The rectifying charge storage device of claim 40 wherein said output signal is a parameter-responsive variable voltage output signal.

43. The rectifying charge storage device of claim 40 wherein said output signal is a parameter-responsive variable frequency output signal.

44. The rectifying charge storage device of claim 24 further including a substrate supporting the rectifier and capacitor structures.

45. The rectifying charge storage device of claim 44, wherein said capacitor structure comprises said common conductor, a second conductor, and a dielectric material therebetween, said substrate being incorporated into said dielectric material.

* * * * *